(12) United States Patent
Demuth et al.

(10) Patent No.: US 11,175,819 B2
(45) Date of Patent: Nov. 16, 2021

(54) VIRTUAL FUNCTIONAL MODULES FOR MEASURING DEVICES AND EQUIPMENT COMPONENTS

(71) Applicant: WIKA Alexander Wiegand SE & Co. KG, Klingenberg (DE)

(72) Inventors: Ulrich Demuth, Erbach (DE); Thomas Rothenbach, Buergstadt (DE); Paul Hanesch, Aschaffenburg (DE)

(73) Assignee: WIKA Alexander Wiegand SE & Co. KG, Klingenberg (DE)

( * ) Notice: Subject to any disclaimer, the term of this patent is extended or adjusted under 35 U.S.C. 154(b) by 831 days.

(21) Appl. No.: 15/581,038

(22) Filed: Apr. 28, 2017

(65) Prior Publication Data

US 2017/0315693 A1   Nov. 2, 2017

(30) Foreign Application Priority Data

Apr. 28, 2016 (DE) .................... 10 2016 005 103.5

(51) Int. Cl.

| | | |
|---|---|---|
| *G06F 17/00* | (2019.01) | |
| *G06F 3/0488* | (2013.01) | |
| *G01D 4/00* | (2006.01) | |
| *G06F 3/0481* | (2013.01) | |
| *H04Q 9/00* | (2006.01) | |
| *G06K 7/14* | (2006.01) | |
| *H04N 5/445* | (2011.01) | |
| *G01D 7/00* | (2006.01) | |

(52) U.S. Cl.
CPC .......... *G06F 3/0488* (2013.01); *G01D 4/006* (2013.01); *G06F 3/0481* (2013.01); *G06F 3/04817* (2013.01); *G06K 7/1417* (2013.01); *H04N 5/44504* (2013.01); *H04Q 9/00* (2013.01); *G01D 7/005* (2013.01); *G08C 2201/93* (2013.01); *H04Q 2209/40* (2013.01); *H04Q 2209/60* (2013.01); *Y02B 90/20* (2013.01); *Y04S 20/30* (2013.01)

(58) Field of Classification Search
CPC .... G06F 9/452; G06F 9/45533; G06F 3/0488; G06F 3/0481; G06F 3/04817; G01D 4/006; G01D 7/005; G01D 5/39; G01D 13/00; H04Q 9/00; H04Q 2209/60; H04Q 2209/40; G06K 7/1417; H04N 5/44504; Y02B 90/20; Y04S 20/30; G08C 2201/93
See application file for complete search history.

(56) References Cited

U.S. PATENT DOCUMENTS

| | | | |
|---|---|---|---|
| 9,992,613 B2 | 6/2018 | Brockhaus et al. | |
| 2009/0212113 A1* | 8/2009 | Chiu | G06K 7/14 235/462.41 |
| 2011/0105103 A1* | 5/2011 | Ullrich | G06F 3/017 455/420 |

(Continued)

FOREIGN PATENT DOCUMENTS

| | | |
|---|---|---|
| DE | 2014 115 514 B3 | 4/2016 |
| WO | WO 2014/026787 | 2/2014 |

*Primary Examiner* — Andrew T McIntosh
(74) *Attorney, Agent, or Firm* — Muncy, Geissler, Olds & Lowe, P.C.

(57) ABSTRACT

A system for detecting, analyzing and manipulating devices, wherein a virtual graphics component displays an operating state of the device and is integrated in a moving image of the device as a complete image, and wherein the complete image is updated at regular time intervals.

22 Claims, 10 Drawing Sheets

(56) References Cited

U.S. PATENT DOCUMENTS

| | | | |
|---|---|---|---|
| 2011/0115816 A1* | 5/2011 | Brackney | G06Q 10/06 345/629 |
| 2014/0118239 A1* | 5/2014 | Phillips | G06F 9/452 345/156 |
| 2014/0281758 A1* | 9/2014 | Klein | G06F 11/327 714/57 |
| 2015/0102984 A1* | 4/2015 | Wong | G02B 27/017 345/8 |
| 2015/0261398 A1* | 9/2015 | Madden | G06F 9/451 715/744 |

\* cited by examiner

VIRTUAL FUNCTIONAL MODULES FOR MEASURING DEVICES AND EQUIPMENT COMPONENTS

This nonprovisional application claims priority to German Patent Application No. 10 2016 005 103.5, which was filed in Germany on Apr. 28, 2016, and which is herein incorporated by reference.

BACKGROUND OF THE INVENTION

Field of the Invention

The invention relates to a system for detecting, analyzing and manipulating devices. The invention further relates to a method of detecting, analyzing and manipulating devices.

Description of the Background Art

From the prior art, combining equipment and industrial components via an internet connection is generally known. Also in the conventional processing industry and in the field of equipment and production, as well as with mobile working tools, vehicles and components, it is necessary to read operating states and make adjustments. To this end, these components include switches, buttons, displays and interactive displays. Depending on the application, these are protected by a so-called IP protection class with covers, which define how and where electronic devices can be used without getting a safety risk, in particular in environments where the devices must stand rough conditions and work for their intended period of time.

For example, pressure switches with displays and adjustable pressure values and switching thresholds are generally known. So-called process transmitters which detect a process pressure and convert it into an electrical signal also exist. These have a greater accuracy and are, for example, provided with a screw cap to protect against environmental influences. Both abovementioned measuring devices allow for operation and local reading in a unit of equipment.

In larger devices, however, there is often the problem that measuring devices are arranged in poorly accessible positions.

To solve this problem, various systems and methods for detection, analysis and manipulation of devices are known from the prior art.

For example, DE 10 2014 115 514 B3 describes a method for connecting a field device to an operating unit, wherein a request signal is transmitted to the field device by the operating unit. The field device generates at least one response signal in reply to the request signal in that the field device generates a blinking display, a color change of a display, an acoustic signal, or a change in an acoustic signal. In the response signal, data for connecting the field device to the operating unit is transmitted, wherein the response signal is a password, or portions of a password. The password allows access to the field device, wherein the operating unit transmits the password to the field device.

Furthermore, WO 2014/026787 A1 describes a system and a method for monitoring an operating state of a turbine unit via an electronic mobile terminal. In this case, an application stored in the electronic mobile terminal is started by a user. Then, a component of the turbine unit is detected by the user with a camera of the electronic mobile terminal, wherein the component is assigned an identifier. By a determination means, the component of the turbine unit, or the turbine unit to which the component belongs, is determined in a database by comparison based on the identifiers recorded, wherein in the database, a respective identification feature is stored for each component of the turbine unit. From a computer unit, at least one piece of information, in particular an operating parameter of the component determined by the comparison or by the turbine unit identified, is transmitted to the electronic mobile terminal. Through the application on the electronic mobile terminal, the transmitted information is associated with the camera shot and is displayed on a display unit of the electronic mobile terminal.

SUMMARY OF THE INVENTION

It is therefore an object of the invention to provide an improved system and an improved method as compared to the prior art for the detection, analysis and manipulation of devices.

In an exemplary embodiment, the inventive system for the detection, analysis and manipulation of devices, such as measuring devices, equipment and/or equipment components, comprises a mobile terminal with an optical detection unit, for example a camera, a display and an operating unit, wherein by means of the optical detection unit, marking patterns on the devices and images of the devices can be detected. The system further comprises a cache for storing device data received from the devices, a graphic memory for stocking device-specific virtual graphics components and a processor, which adapts a virtual graphics component in dependence of the device data received, optically analyzes a detected image of a device and combines this with the virtual graphics component into a complete image, a so-called augment reality image. In this case, the virtual graphics component displays an operating state of the device and the display outputs the complete image that is updated at predetermined intervals.

A user who, for example, consults a meter which has the abovementioned marking pattern, will see when viewing the meter on his or her mobile terminal, instead of the marking pattern, a display with various components that are constantly updated. Here, the display as a virtual graphics component is not only inserted in accordance with the viewing angle and updated according to movement with respect to the spatial position, but measured values, buttons and indicators are also updated permanently or at certain intervals, depending on the quality of the connection.

The system provides a simple, reliable and cost effective solution for the reading of measured values, setting values and/or states of operation, as well as for the operation and configuration of systems components such as pressure gauges, temperature gauges and level or flow measuring instruments or other systems components such as pumps, valves or other measuring devices. Furthermore, the system allows for the display on the mobile terminal to be cost-effective, reliable and protected against environmental influences. By using the mobile terminal as a display, additional displays on the device can be eliminated, thereby saving costs. Furthermore, even if the positioning of the device is difficult for the user to access, simple and convenient access for the user to information about the device, in particular measuring values, setting values and/or operating states, is possible.

In an embodiment, the system provides that the graphics memory is a part of a local database stored on the mobile terminal and/or of a central database.

In an embodiment, the mobile terminal, for example, can be a portable computer, a smart phone, so-called virtual reality glasses, a tablet, etc.

In particular, the mobile terminal comprises a camera as an optical detection unit, a screen as a display and a user interface. The user interface can be, for example, a keyboard, a touch-sensitive screen, a touchpad or a combination of a display with pressure-sensitive buttons that are displayed on all or part of the screen.

In an embodiment of the system, the database is part of a web-based server application in which the devices and their associated marking patterns are managed. It is also possible that the web-based server application manages and adjusts, which surfaces and displays are projected into the complete image when during a first contact with the mobile terminal and with a user program running on this terminal, also referred to as an application or App, the marking pattern is scanned for the first time. The database may alternatively also be stored in the mobile terminal and/or be cross-checked with a server at predetermined time intervals.

For example, calibration and/or configuration of the device are also possible by means of the system, for which purpose calibration and/or configuration data are stored in the device, the mobile terminal or the database. The calibration and/or configuration is done via the virtual display. In particular, alerts as a reminder of overdue calibrations can be issued. In conjunction with the database, not only calibration and/or configuration data and protocols, setups and settings can be stored, but also data for an exchange, a replacement and/or a repair of the device, which can thus be queried by means of the mobile device, quasi a so-called TAG identification number which is then stored in the mobile terminal or in the database. User and operating instructions and data sheets for the device can also be called up with the mobile terminal. If, for example, a device such as a motor or a valve is virtually queried by means of the mobile terminal, speeds or strokes or fine adjustments or responses to other parameters and process data can be configured. For example, certain values are represented by the display as animated analog hands on a virtual dial, wherein such representations allow for easy reading of the value even if the value fluctuates slightly or greatly.

In an embodiment of the system, it is provided that the complete image contains animated buttons, wherein the buttons are designed as an interactive virtual user interface for accessing states or a change in states of the device. Thus, in addition to the option of reading measured values, setting values and/or operating states, it is possible to easily control the unit by means of the mobile terminal.

In an embodiment of the system, it is provided that the marking pattern applied on the device includes at least two mutually perpendicular lines or edges or a frame, based on which the virtual graphics component can be aligned to the image of the device. In this way, for data processing, it is possible in a simple manner to detect and/or determine a position of a surface of the device in the room by using corner angles. At the same time, the size of a device can be determined by the length or size of the lines or edges or the frame.

It is also possible that an alignment, size adjustment, adjustment of the depth of focus and/or adjustment of an image scale occurs automatically by means of the image detection unit so that the acquired image of the corresponding device is optimally adapted to the display and is thus particularly easy for the user to identify.

In order to enable a simple and reliable identification of the device, a possible further development of the system provides that the marking pattern applied on the device contains dot or line-shaped encodings, based on which the device is identified.

According to an embodiment of the system, the complete image contains animated buttons which are displayed on the device redundant to switching functions or which replace switching functions provided on the device. In this way, an intuitive and secure operation for the user is achieved and the risk of operator errors is reduced.

According to an embodiment of the system, a plurality of virtual graphics components is stored in the graphics memory, wherein according to the encoding detected, pre-stored virtual graphics components compatible with the unit are loadable, and measured values and/or settings or buttons of the device can be transferred to the graphics components and can be updated. Thus, users are always provided with updated, unit-specific measured values that are clear and adapted to the appropriate device.

In an embodiment, device-specific operating instructions, setup menus, tools of analysis, error analysis or data log functions are stored in a memory and/or the database that can be called up in dependence on the detected encoding, are server-based or locally transferrable between the mobile terminal and the memory and/or database, and/or are executable by means of the mobile terminal and/or the device. This allows for simple and quick information retrieval for the user about the device in question, wherein all relevant information can be output together with the associated settings on the same mobile terminal.

To allow for a simple interconnection of the mobile terminal with the device, a possible configuration of the system specifies that between the device and the mobile device, a radio connection, an optical connection and/or a cable are provided for a bidirectional data exchange or that the device and the mobile terminal are connected to one another through a network, a data bus system, and/or an internet connection with the optional aid of a data server. In this case, the bidirectional data exchange allows that effects of a setting made on the device are issued promptly on the display of the mobile terminal. Thus, the user can respond very quickly to the effects and make adjustments if needed.

The optical connection takes place, for example, via light, wherein the device e.g. comprises a flashing light, a light-emitting diode and/or a light receiver. The mobile terminal may for example detect coded flashing signals via the optical detection unit, analyze these and send a reply using a light source, such as an integrated fill flash, to the device. In an embodiment, the brightness of a fill flash can be variably adjustable.

In particular, the data transmission between the device and the mobile terminal is secured. For this purpose, for example, protocols and reconfirmation algorithms are provided, which are clearly linked to the identity of the device or the equipment component, and to the respective mobile terminal. For example, for this purpose, the optical detection unit of the mobile terminal has uninterrupted visual contact with a marking pattern of the device.

For example, user-specific access rights are also provided, which for different users include different access levels, varying extents of access and/or different access depths to features of the device such as viewing rights, or a viewing and display that is dependent on different types of rights to be able to operate the device. Depending on expertise, user access to specific information and services may be enabled or disabled. Manipulation and therefore incorrect function of the device are thus also effectively prevented. Further, the devices are guarded against accidental adjustments. Operation can also be made possible only for a limited circle of users, as soon as or as long as the device completely detects the marking pattern.

In an embodiment of the system, the access rights are stored in a database.

In an embodiment of the system, for integration into the complete image presented for the user by the display of the mobile terminal, the virtual graphics components contain animated switches and graphic elements which are optically modeled after at least one real switch of the device. In this way, intuitive and secure operation for the user is achieved and the risk of operator errors is reduced.

A further development of the system provides that the display of the mobile terminal comprises a touch-sensitive screen.

For example, the touch-sensitive screen is designed to provide a graphic user interface, for example, animated buttons and/or keyboards to manipulate features of the device within the virtual graphics component. In this way, a simple, intuitive and secure operation is obtained for the user and the danger of incorrect operation is reduced.

Furthermore, it is possible that the mobile terminal and the device are designed such that for activation of a data transfer between the mobile terminal and the device, the mobile terminal is supported on the device with the touch-sensitive screen. This can ensure that there is no interruption of data transfer between the device and the mobile terminal. It is further possible to transmit an authorization from the mobile terminal to the device in a simple manner with a so-called Near Field Communication (NFC).

To enable this contact of the mobile terminal, the device includes, for example, a marked support surface with a contact edge, wherein the support surface includes at least one detection unit for detecting the contact of the device. This provides the user with a simple and secure support of the mobile terminal on a position optimally aligned with the detection unit.

According to an embodiment, an analysis unit is provided that is designed to transform the marking pattern comprising an alphanumeric or numeric encoding into a measured value with a unit or a different variable, and to integrate it into the complete image.

In an embodiment of the system, the detected and optically analyzed image is a moving image or a sequence of consecutively detected images, in particular a so-called live image. The moving image always allows for displaying an image of the device corresponding to the alignment of the mobile terminal, for example as in known from augmented reality.

A further development of the system provides that in the case of remote activation, the mobile terminal displays the detected and optically analyzed image of the device unchanged during a movement of the mobile terminal, relative to the device as a single or still image, and continuously updates the virtual graphics component. In other words, a background image showing the device is frozen and the graphics component forming a dynamic image section is updated. This also occurs, for example, if the present position is changed. Thus, a monitoring of measured values, setting values and/or operating states or another state is possible from a position distant from the device.

A possible application of such a remote activation, for example, is the filling of a heating oil tank or a milk tank from a dairy. The filling can be virtually observed or controlled over a remote application even at a greater distance from the device, for example, even without visual contact through other objects. For example, in this way, a valve can be shut off at the right time even at a greater distance from the device. For example, a tank level indicator distant from the device, i.e. in the presence of the tank, can be output by the mobile terminal on a tank truck to close a valve once the desired filling level has been reached. It is advantageous to control access rights, so that there are neither access errors nor unauthorized access occurs. For this purpose, it may possibly be useful in each case to always establish direct visual contact to the meter in an original construction or a reconstruction, before the remote connection distant from the device is activated.

For example, it is also possible to animate filling levels in tanks via a virtual window on the display. The filling level is then converted into a graph via, e.g., a static pressure or a measured value of another measurement probe. Dependent on other parameters, such as density, a filling substance of the tank, e.g. milk, can be identified and, in the case of milk, displayed in the virtual window as a white filling level.

In conjunction with the use of so-called virtual reality glasses as a mobile terminal, it is possible that processes within the device are made visible through a transparent or semi-transparent display. For example, liquids or solids or processes are represented by virtual windows according to the data on the display. Thus, e.g., boiling water upon detecting an appropriate temperature, a flowing medium according to a measured flow and exothermic processes corresponding to a measured temperature are shown or visualized.

In particular, the system allows that upon reaching a device designed as a measuring instrument or equipment component, the mobile terminal designed, for example, as a portable computer, a smartphone, so-called virtual reality glasses or a tablet, is used as a display and operation substitution interface.

For this purpose, for example, a user activates a program, also referred to as an application, on the mobile terminal, which activates the optical detection unit of the mobile terminal to represent a moving image, for example a live image, acquired by said camera, on the display designed as a screen. At the same time, the image is scanned by a marking pattern.

As soon as a meter or an equipment component with such an applied marking pattern is detected by the detection unit, the device is detected based on the encoding, and depending on the position in the area, a virtual display and/or switching elements and/or operating elements are or is projected onto the image via the marking pattern. Therefore, when viewing the measuring device or the equipment component on the screen of the mobile terminal, the user has the impression of seeing a device with a display and e.g. key elements. In particular, these virtual keys can be operated via, e.g., a touchscreen of a smartphone. Commands, such as a keystroke which is projected virtually below the image to the device, can, e.g., trigger the change of a measurement unit from mbar to psi.

In an embodiment of the system, it is also provided that a plurality of components, active equipment components such as pumps, gauges and passive system elements such as containers, are combined to a common process graphics and that an associated process is controlled virtually using the mobile terminal. Here, it is also possible to switch to the device in a remote state, wherein said device is shown schematically on a wall or other projection surface. This schematic presentation is assigned to the corresponding device by means of the associated marking pattern, wherein the marking patterns in particular for mounting on the device are arranged parallel on a process template. This way, the process can be fully observed and controlled by the mobile terminal. In connection with gesture recognition, virtual control of the process is also possible by, for example, valves being actuated by gestures, such as rotating, turning or swiping gestures.

In the present method of detecting, analyzing and manipulating devices, such as measuring devices, equipment and/or equipment components, when using a mobile terminal comprising an optical detection unit, a display and an operating unit, marking patterns are detected on the devices by means of the optical detection unit. Furthermore, a virtual graphics component is loaded from a database and is processed into a complete image with a detected and optically analyzed image of a device, wherein by means of the virtual graphics component, an operating state of the device is displayed, and the complete image is updated at predetermined time intervals.

The method allows for a simple, reliable and cost-effective reading of measured values, setting values and/or states of operation as well as operation and configuration of equipment components such as pressure gauges, temperature gauges and filling level or flow meters or other equipment components, such as, for example, pumps, valves or other measuring devices. The method further allows that the display can be made on the mobile terminal inexpensively, reliable and protected against environmental influences. By using the mobile terminal as a display, additional displays on the device can be eliminated. Furthermore, also in device positions that are difficult for the user to access, simple and convenient access for the user to information about the device, in particular measuring values, setting values and/or operating states, is possible.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
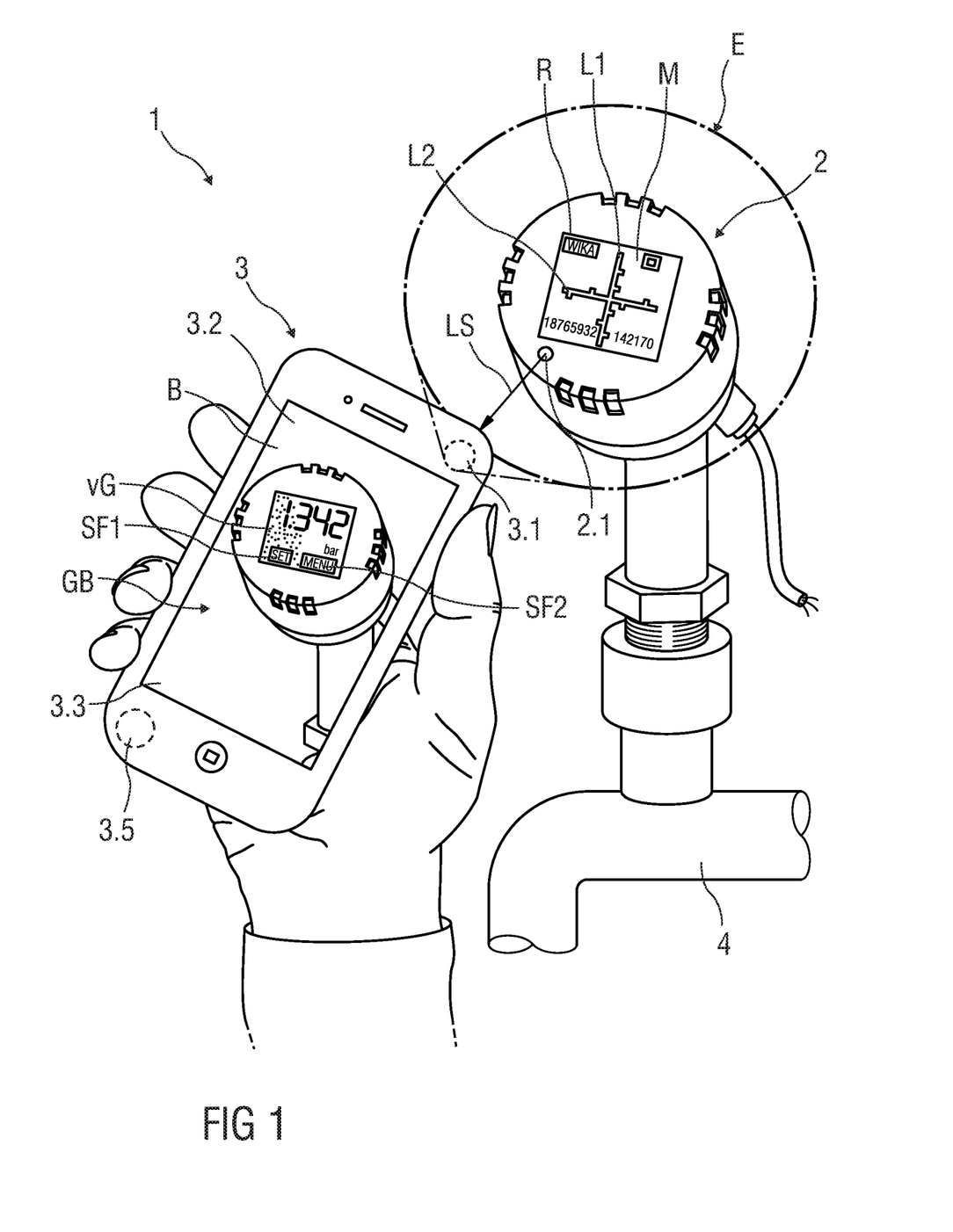
FIG. 1 is a schematic first perspective view of a system for detecting, analyzing and manipulating devices in a first state.

FIG. 1 shows a perspective view of a possible embodiment of an inventive system 1 for detecting, analyzing and manipulating devices 2.

In the illustrated embodiment, the device 2 is a pressure gauge designed as a so-called process transmitter which detects a process pressure in a unit of equipment 4 and converts it into an electrical signal.

The system 1 comprises a mobile terminal 3, which can be a smartphone. The mobile terminal 3 includes at least one optical detection unit 3.1 designed as a camera with a detection area E, a processor 3.5, a display 3.2 and an operating unit 3.3. In the embodiment shown, the display 3.2 and the operating unit 3.3 are combined in a touch screen.

After an activation of a program, also referred to as an application, on the mobile terminal 3, the detection unit 3.1 is enabled and by means of said unit, a moving image B, in particular a so-called live image, of the device 2 is acquired and displayed on the display 3.2.

Simultaneously, the image B is searched for a marking pattern M on the device 2 and is thus optically analyzed.

Using the marking pattern M and a database that is stored locally on the mobile terminal 3 or is stored in a remoted database and can be accessed via, for example, a web-based server application, the type of device 2 is ascertained. Subsequently, a device-specific virtual graphics component vG is transmitted from the database to the processor 3.5 of the mobile terminal 3 for processing with the detected and optically analyzed image B of the device 2 into a complete image GB. The virtual graphics component vG thereby shows an operating state of the device 2 and is updated at predetermined time intervals.

In the illustrated embodiment, the process pressure in the unit of equipment 4 is shown as the operating state by means of the virtual graphics component vG.

On display 3.2 of the mobile terminal 3, the virtual graphics component vG is projected on the image B of the device 2.

The marking pattern M is thereby preferably completely covered by the virtual graphics component vG.

It is also conceivable that the device 2 has a molded surface, which only when viewed using the mobile terminal 3 becomes a display and/or an input interface with keys.

In order to always enable a correctly positioned arrangement of the virtual graphics component vG on the display 3.2, relative to the device and independent of an orientation of the mobile terminal 3 and thus of the detection unit 3.1, the marking pattern M applied on the device 2 contains at least two mutually perpendicular lines L1, L2 and a frame R, on the basis of which the virtual graphics component vG can be aligned towards the image B of the device 2. Alternatively, the positional arrangement of the virtual graphics component VG on the display 3.2 can done in that, for example, an outer contour or distinctly molded contour of the device can be used separate from or in combination with the marking pattern M.

In a highly simplified version, the marking pattern M on the device 2 has an alphanumeric or numeric identifier, which is, for example, part of a standard label. Upon detection by the detection unit 3.1, e.g., an ID number is recorded and translated or transferred into a measured value with a device. Also, the marking pattern M may be constructed as a barcode or other opto-electronically readable font, for example, as a so-called 2D code or 2D barcode or QR code.

Alternatively, or additionally, identification of the device 2 by the mobile terminal 3 by means of an RFID chip disposed on or in the device 2, for example, in the label, is possible.

In the area of the virtual graphics component vG, the complete image GB illustrated contains animated buttons SF1, SF2, which are configured as an interactive virtual user interface for access to states or a change in states of the device 2. In the illustrated embodiment, a first button SF1 is a selection key and a second button SF2 is a key to open a selection menu. Pressing a button SF1, SF2 on the display 3.2 corresponds to an actuation of a switching function on the device 2, which is, for example, redundantly arranged under a cover on the device 2 or is eliminated by using the system 1 with the mobile terminal 3.

Figure 2:
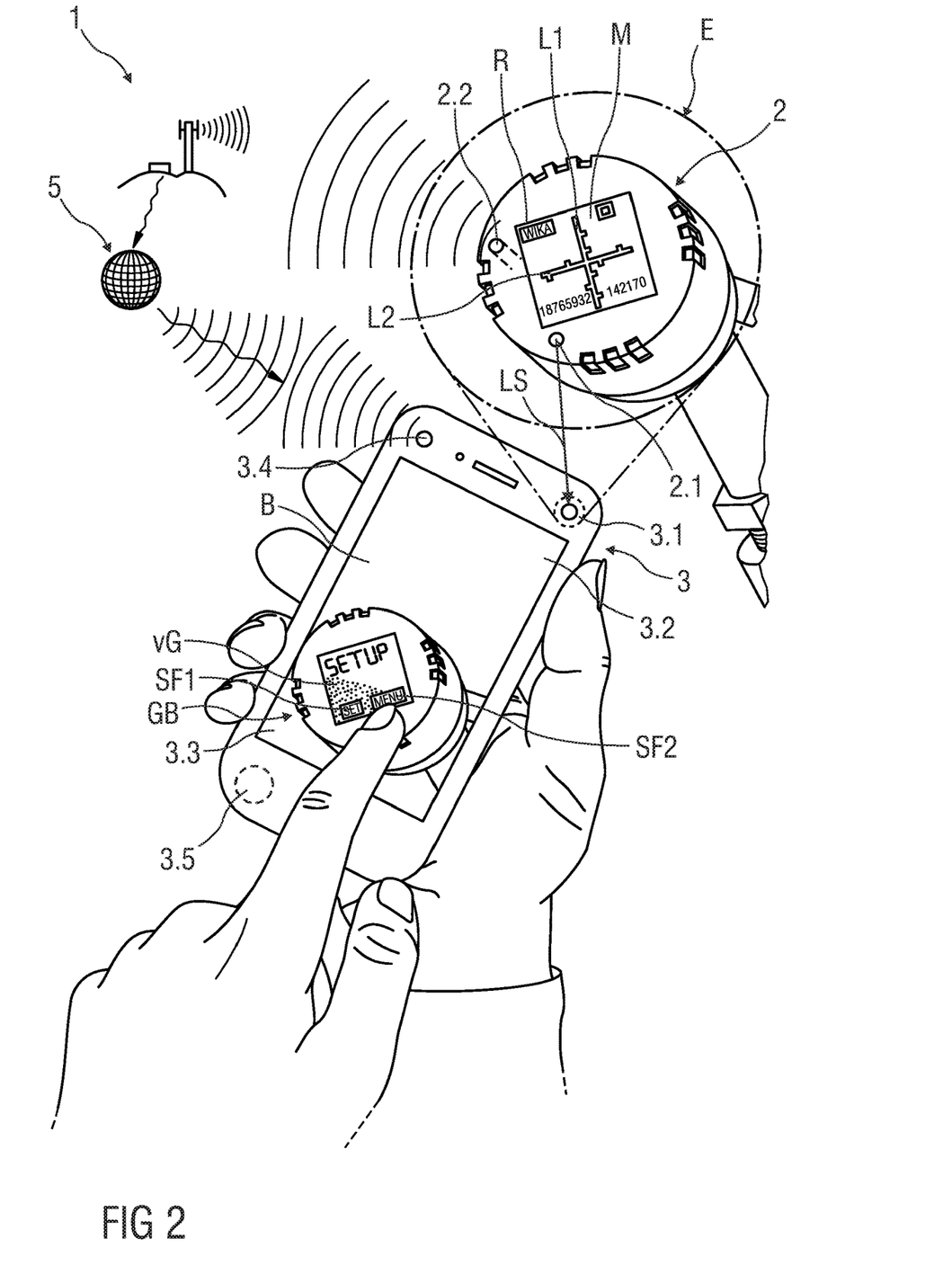
FIG. 2 is a schematic second perspective view of a system for detecting, analyzing and manipulating devices in a first state.

For the transfer of necessary data from the mobile terminal 3 to the device 2 and vice versa, it is provided that for a bidirectional data exchange, a radio connection, an optical connection and/or a cable are or is provided between the device 2 and the mobile terminal 3, or that the device and the mobile terminal are interconnected by means of a network, a data bus system and/or an internet connection with the optional aid of a data server 5 shown in detail in FIG. 2.

The optical connection can be realized with light, wherein the device 2 in the illustrated embodiment includes for this purpose a light-emitting diode 2.1. With the detection unit 3.1, the mobile terminal 3 detects coded light signals LS emitted by the light-emitting diode 2.1 as alignment data, for example, flashing signals, analyzes them and, depending on the results of the analysis, displays the relevant information in the virtual graphics component vG.

For example, the light-emitting diode is designed to output light signals LS of different colors, wherein, for example, a blue light signal LS indicates that a data connection between the device 2 and the mobile terminal 3 has been established. A red light signal LS indicates, for example, that there is an error, that a tank is completely filled or a set point has been reached.

In particular, it is further possible to detect the presence of the mobile terminal 3 in a receiving area of the device 2 on the basis of an analysis by the RFID chip or a transmission level of the radio link or the direct placement of the mobile terminal 3 on a support provided for this purpose on the device 2 and not further shown. Over a local link and by integrating the mobile terminal 3, in particular, erroneous operation of another device is prevented.

To be able to place the mobile terminal, the device 2 comprises in a manner not shown, for example, a support surface with a contact edge, wherein the support surface includes at least one detection unit 3.1. for detecting the contact of the device.

FIG. 2 shows a perspective view of the system 1, in which in addition to the embodiment shown in FIG. 1, a wireless data connection is established between the mobile terminal 3 and the device 2 via an internet connection, bluetooth, etc.

Here, a bidirectional data exchange between the device 2 and the mobile terminal 3 is carried out with the aid of a central data server 5. To establish the data connection, the device 2 and the mobile terminal 3 each have respective interfaces 2.2, 3.4.

Figure 3:
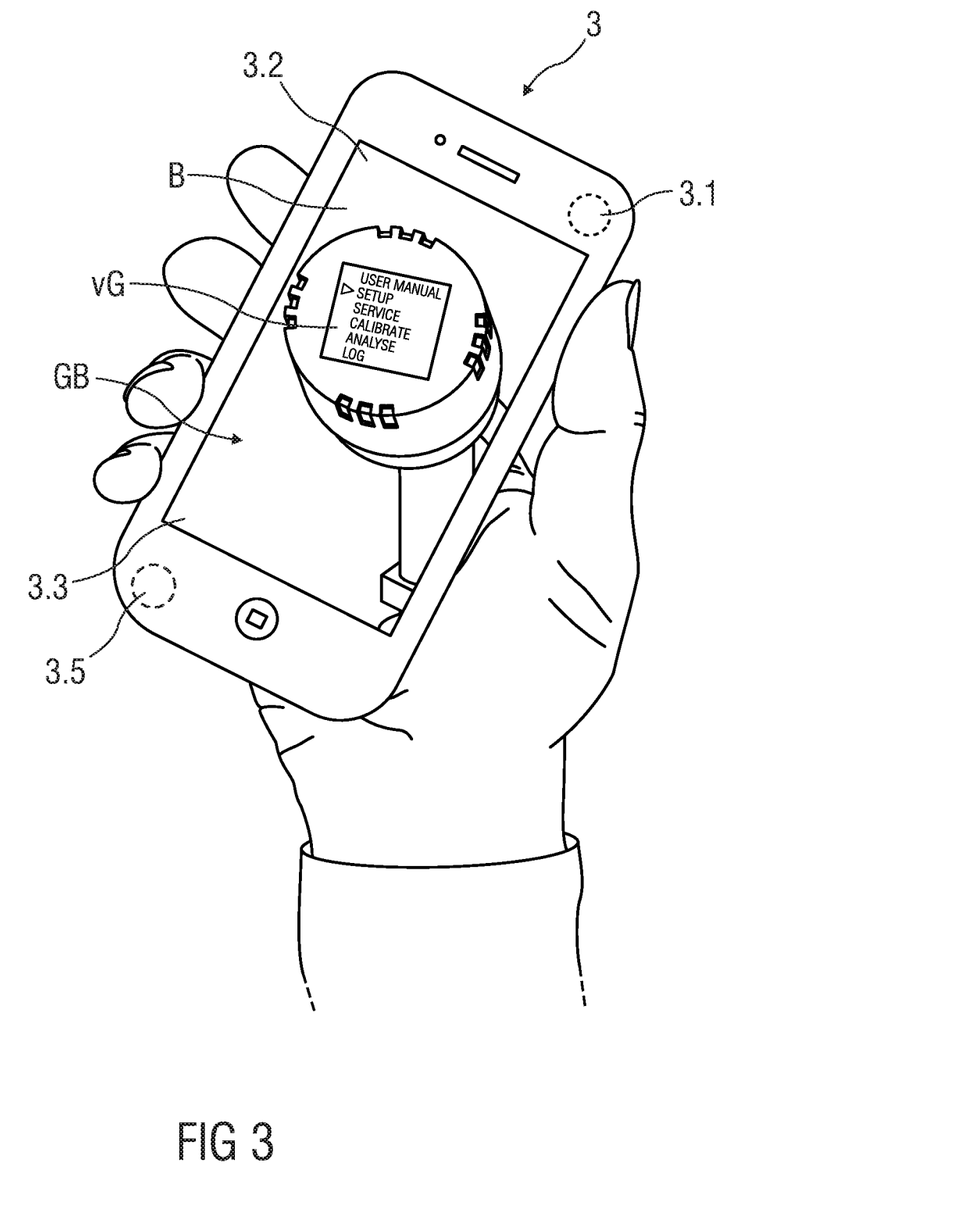
FIG. 3 is a schematic perspective view of a mobile terminal with an illustrated first complete image.

FIG. 3 shows a perspective view of the mobile terminal 3 with an illustrated complete image GB, which represents a selection menu by means of the virtual graphics component vG. By touching the display 3.2 at the corresponding position, a desired menu item can be opened.

It is also possible to activate so-called graphical or numerical log functions and representations of recorded values or to perform device configurations also with respect to a so-called Safety Integrity Level (short: SIL).

Regarding the intelligent networking of a production, for example, by means of Industry 4.0 or IoT (internet of things), the networking of the device 2 and/or mobile terminal 3 with other components can be locally controlled, visualized and configured, if needed.

Against the background of intelligent networking of the production or a networked industrial automation, it is possible to access and influence adjacent processes through the mobile terminal 3. Thus, other equipment components, which are mounted at another position but are linked with a currently detected component or the currently detected device 2, are read and configured. For this purpose, in particular, secure access to a data network is necessary in which multiple devices 2 are linked together. In particular, admission to access to the entire network or multiple devices 2 occurs only when authorization has been granted and, for example, an access code was entered. It is also possible that respective "sub codes" are disposed or stored on or in the device 2 as RFID codes, QR codes, part of so-called RSA codes or other codes. This prevents unauthorized persons from unlawfully influencing a process or device 2 over poorly secured interfaces.

It is also possible to access and/or manage operating manuals and other material, such as alignment protocols or test certificates, by using the mobile terminal 3. For this, there is the possibility that upon activation, a corresponding program or a so-called reader for opening the document or file, is started.

Figure 4:
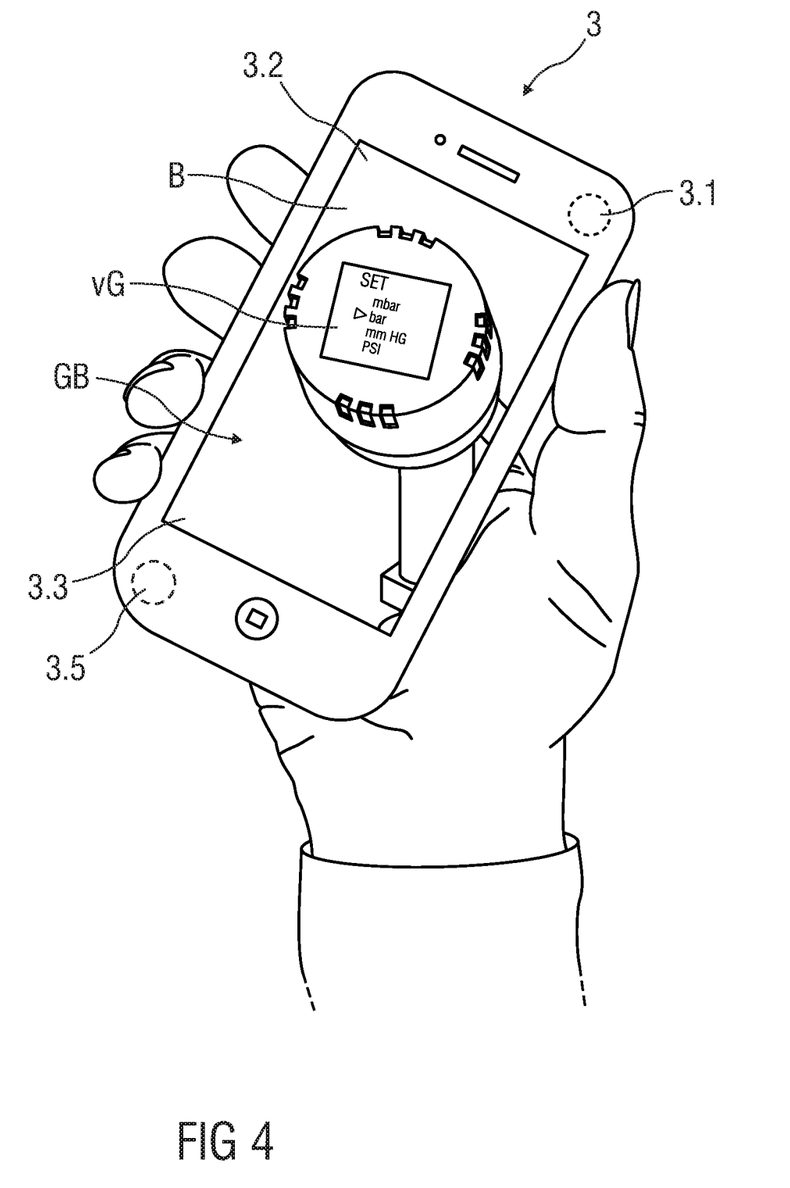
FIG. 4 is a schematic perspective view of a mobile terminal with an illustrated second complete image.

FIG. 4 shows a perspective view of the mobile terminal 3 with an illustrated complete image GB, which by means of the virtual graphics component vG provides different pressure measuring units that are available for selection in a selection menu. By touching the display 3.2 at the corresponding position, a desired pressure measuring unit can be selected.

Figure 5:
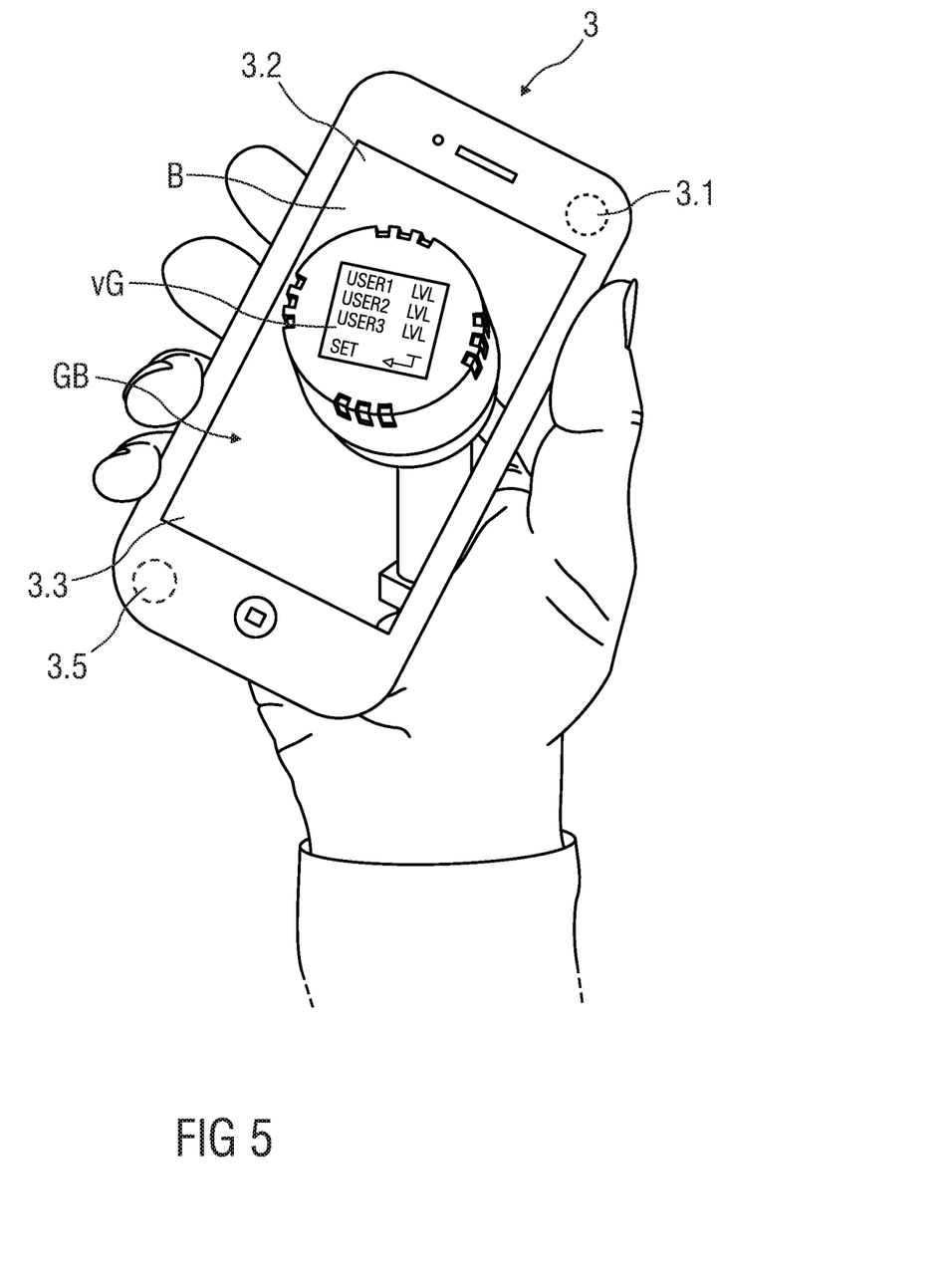
FIG. 5 is a schematic perspective view of a mobile terminal with an illustrated third complete image.

FIG. 5 shows a perspective view of the mobile terminal 3 with an illustrated complete image GB, which by means of the virtual graphics component vG provides different users and their associated access rights for view and selection in a selection menu.

In particular, the system 1 provides user-specific access rights, which comprise different access levels, different extents of access and/or different access depths for features of the device 2 for different operators or users.

For example, a first user only has access to a reading or an indication of a measured value, whereas another user, in particular, receives PIN-protected access to configuration menus of the device 2 and/or other functions.

Figure 6:
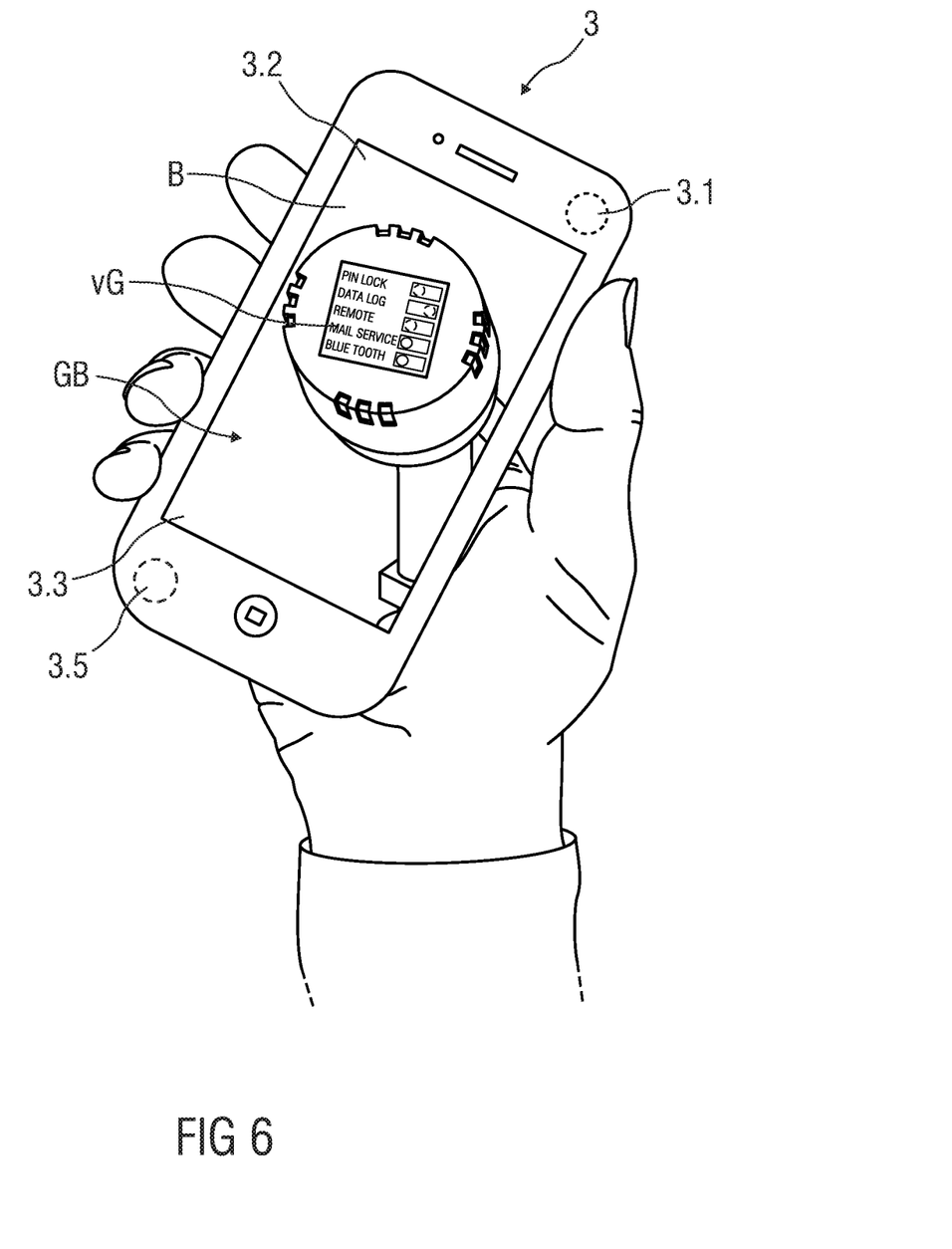
FIG. 6 is a schematic perspective view of a mobile terminal with an illustrated fourth complete image.

FIG. 6 shows a perspective view of the mobile terminal 3 with an illustrated complete image GB, which by means of the virtual graphics component vG displays different animated slide switches in a selection menu, by means of which different functions of the device 2, for example, password protection, a data logger, remote control, so-called push email service, which in case of events automatically sends measurement data, and a radio link of the device 2, can be activated and deactivated. By touching the display 3.2 at the corresponding position or by so-called wiping, a desired slide switch can be operated.

Figure 7:
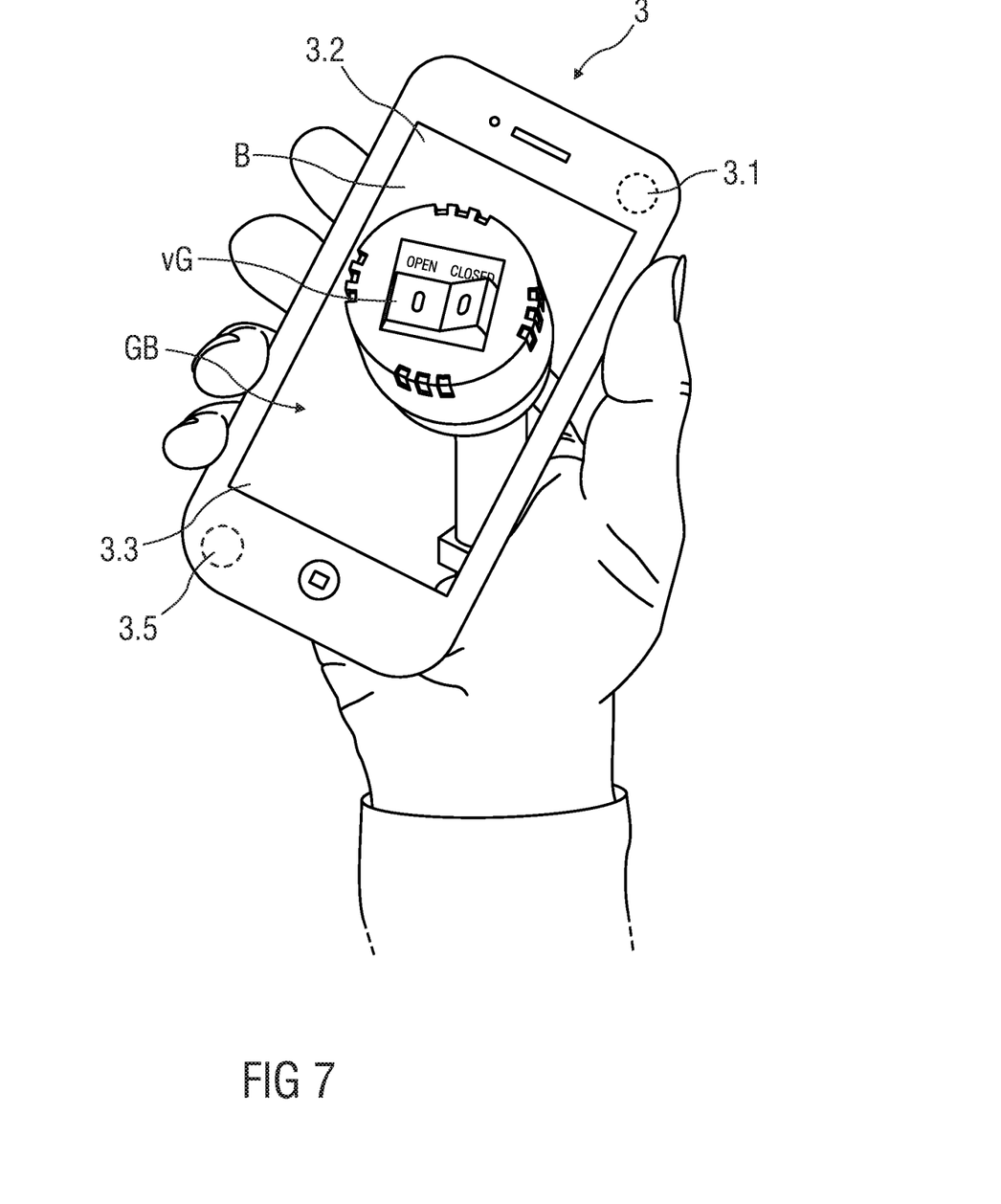
FIG. 7 is a schematic perspective view of a mobile terminal with an illustrated fifth complete image.

FIG. 7 shows a perspective view of the mobile terminal 3 with an illustrated complete image GB, which by means of the virtual graphics component vG shows an animated toggle, which is congruently recorded at the position of the marking pattern M into the image B of the device 2 and into the complete image GB on the mobile terminal 3.

Animated switches and graphic elements represented in the complete image GB are in particular optically modeled after at least one real switch of the device 2 and are provided for switching, controlling and/or regulating functions of the device 2.

By means of the switch or controller, valves can, for example, be opened and closed, motors and pumps can be turned on and off or regulated into a particular state.

Figure 8:
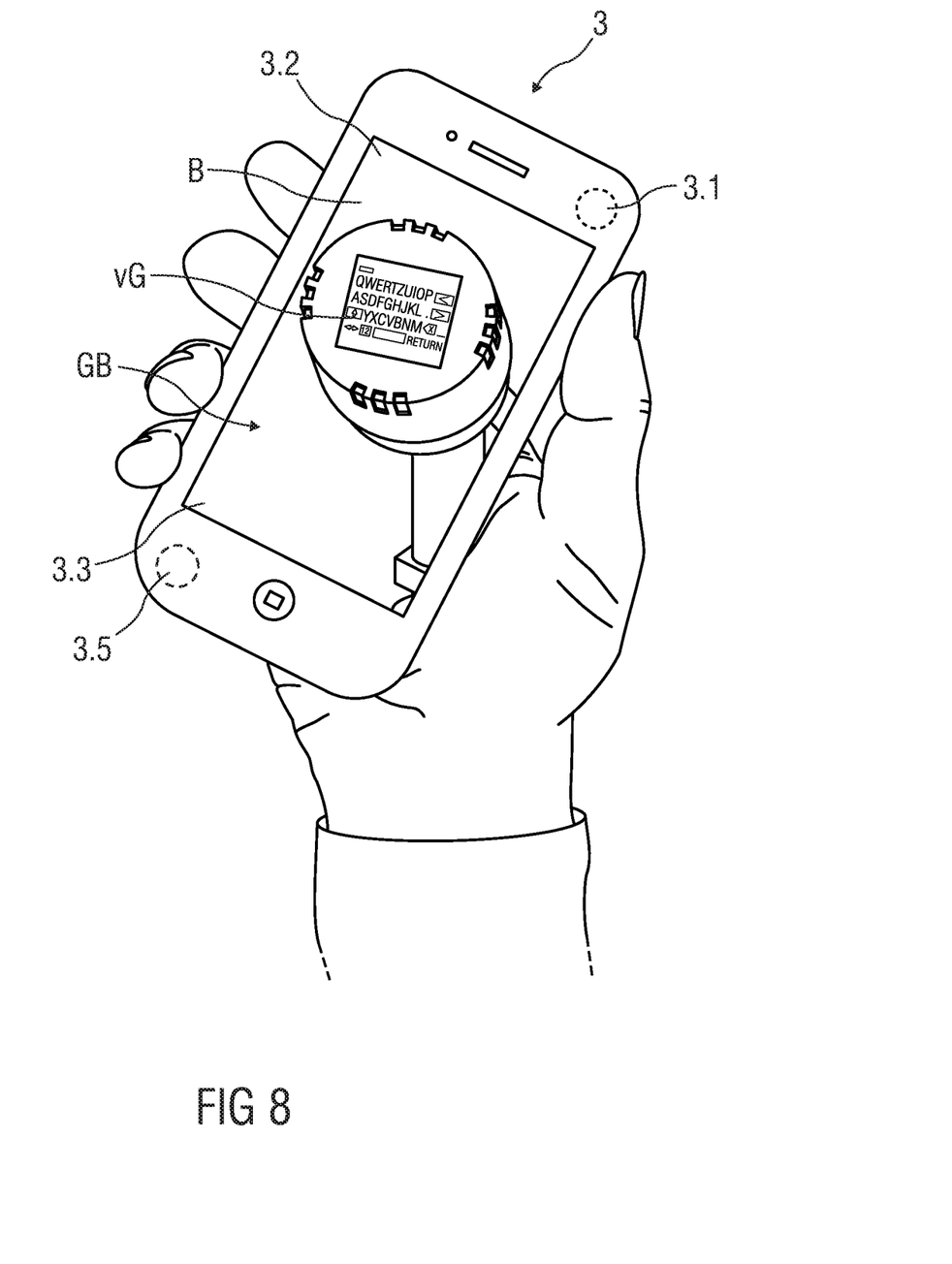
FIG. 8 is a schematic perspective view of a mobile terminal with an illustrated sixth complete image.

FIG. 8 shows a perspective view of the mobile terminal 3 with an illustrated complete image GB, which by means of the virtual graphics component vG displays an interactive keyboard for plain text for the communication of the mobile terminal 3 with the device 2.

During an input, it is possible that the keyboard is shown larger than the frame R of the marking pattern M to enable comfortable input. For this purpose, for example, a standard keyboard that is stored in the operating software of the mobile terminal as a standard input option can be activated, displayed larger and used. Alternatively, or additionally, it is possible to use a keyboard of the device 2.

Figure 9:
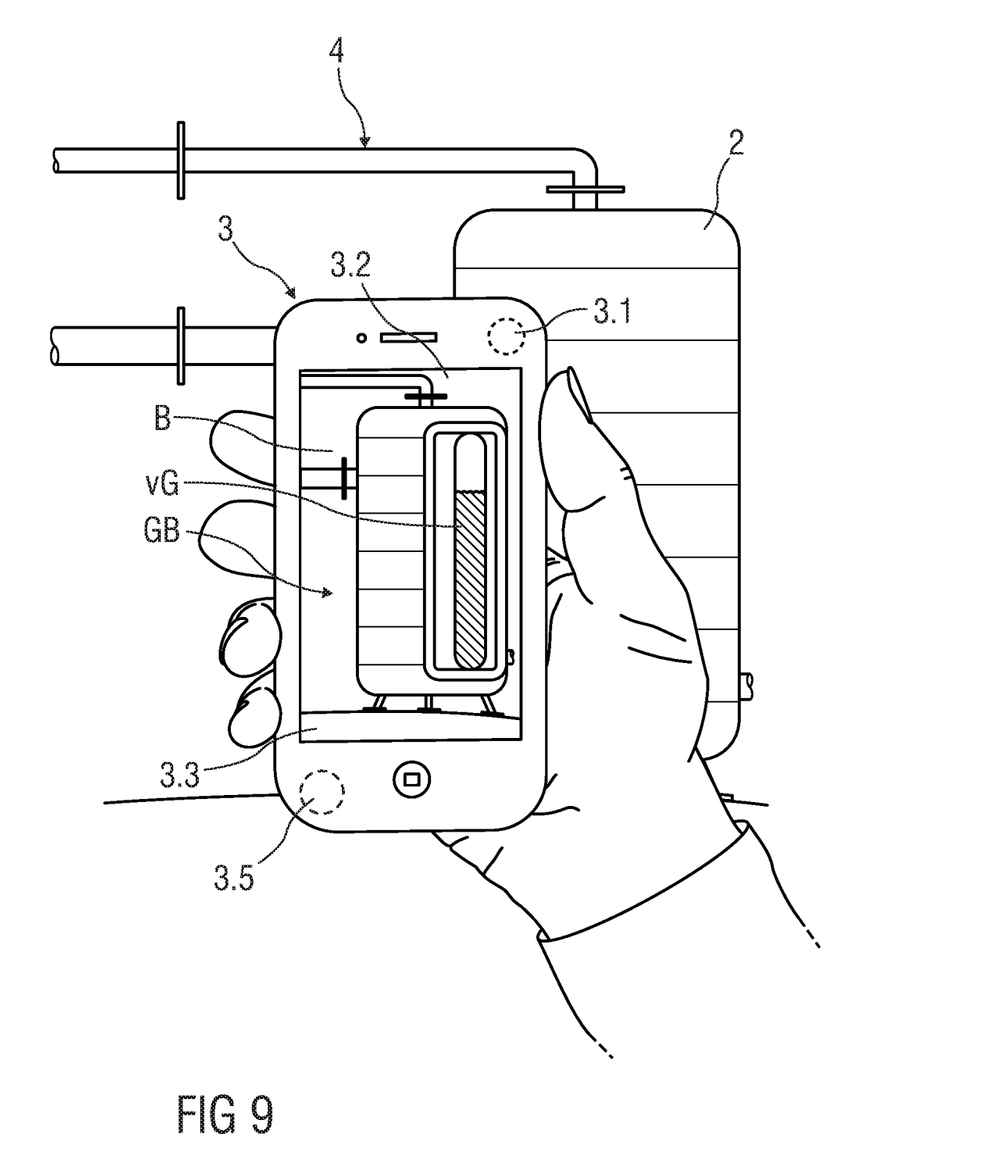
FIG. 9 is a schematic perspective view of a system for detecting, analyzing and manipulating devices.

FIG. 9 shows a perspective view of an embodiment of an inventive system 1 for detecting, analyzing and manipulating devices 2, wherein in the embodiment shown, the device 2 is a tank.

The complete image GB shows the tank as image B and an animated, virtual filling level as the virtual image component vG. To determine the filling levels, a filling level sensor is provided within the tank in a manner not further illustrated, wherein the measurement data is transmitted from the device 2 to the mobile terminal 3 by means of the data connection.

The virtual filling level is illustrated by means of the virtual graphics component vG designed as a vertical bar. A representation of other states of the device 2 is also possible by using other graphics.

For example, temperature information is presented with corresponding changing colors and is stored in the database. Process progress, for example, is represented by a pie chart, or boiling water is illustrated with animated bubbles.

A possible embodiment also provides that as a function of a filler of the tank, the filling level is shown in different colors. For example, milk is shown using a white color and beer is shown using a more transparent, yellow color.

Figure 10:
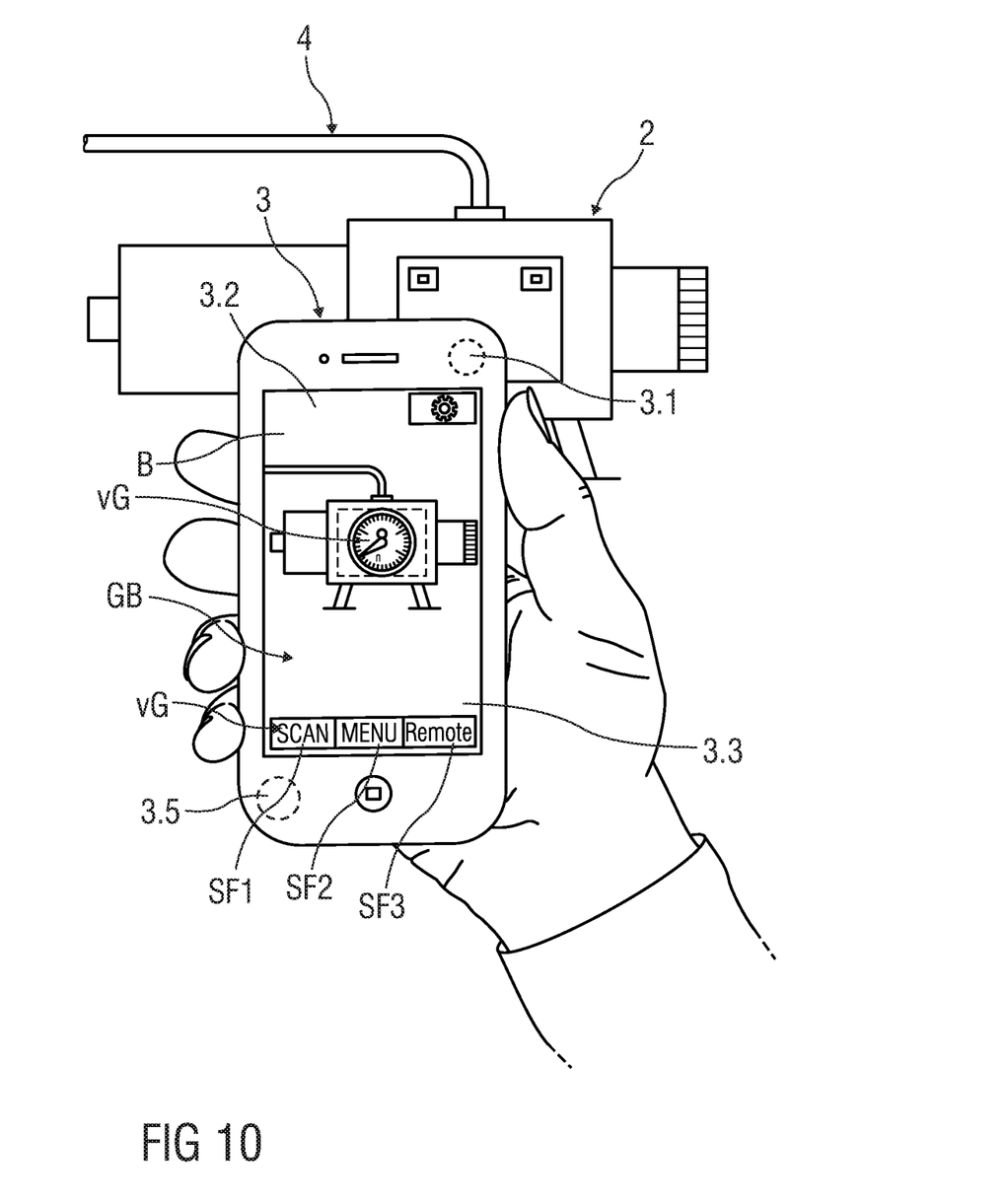
FIG. 10 is a schematic perspective view of a system for detecting, analyzing and manipulating devices.

FIG. 10 shows a perspective view of a possible embodiment of an inventive system 1 for detecting, analyzing and manipulating devices 2, wherein in the embodiment shown, the device 2 is, for example, an equipment component designed as a motor or pump.

In the complete image GB, the device 2 is shown as the image B, and a virtual speed of the device 2 animated with an analog pointer is shown as the virtual graphics component vG. To determine the speed, a speed sensor is provided in a manner not further illustrated, wherein the measurement data is transmitted from the device 2 to the mobile terminal 3 via the data connection.

The marking pattern M on the device 2 not further shown is, for example, a bar code or another opto-electronically readable font, in which two, three or more points are used for aligning the dynamic virtual graphics component vG to be inserted.

Furthermore, three buttons SF1 to SF 3 are provided, wherein by means of a first button SF1, a so-called scanning state for detecting the marking pattern M is activated, which, however, may also start automatically when the application is started on the terminal 3. In certain cases, it may be useful to disable the "auto scan" and to only scan manually, for example, when several devices 2 are side by side but only one is to be detected, e.g., for purposes of configuration.

Particularly when detecting multiple devices 2, e.g., also with terminals 3 that have a larger display 3.2, it is possible that on the display 3.2, multiple detected equipment components or measuring devices are virtually displayed on multiple displays.

With the corresponding configuration, it is also possible to merge multiple marking patterns M into a process structure on a process overview panel, and to supplement with graphs and symbols. On this panel, when viewed with the corresponding glasses or by means of a mobile terminal 3, a user can gain a complete overview of a process with its actual values, and influence these via buttons. To this end, a query of a proximity to the components or the device 2 is deactivated.

Another button SF2 is provided for opening a selection menu.

A third button SF 3 is provided to activate and deactivate a remote state which allows the device 2 to be read or operated by remote, i.e. by remote control, without having to be physically close to the device 2. In this case, when activated, the image B used as a background, showing the device 2, can be shown unchanged as a single or still image, i.e. "frozen", wherein the dynamic graphics component vG is also continued to be updated, if a position is changed. In this way, viewing of a speed or a filling level or other state can also occur from a remote position.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system for detection, analysis and manipulation of a device, the system comprising:
   a mobile terminal having an optical detection unit, a display, and an operating unit;
   a marking pattern arranged on the device, wherein via the optical detection unit, the marking pattern on the device is detected and a representative image of the device is generated on the display;
   a cache or memory for storing device data received from the device;
   a graphics memory for storing device-specific, virtual graphics components;
   a processor that adapts a virtual graphics component based on device data received and combines or overlays the virtual graphics component with the representative image of the device to form a complete image;
   wherein the virtual graphics component displays an operating state of the device,
   wherein the display outputs the complete image that is updated in predetermined intervals, and
   wherein the marking pattern arranged on the device includes edges or a frame that enclose an area on the device, such that in the complete image, the virtual graphics component that is combined or overlayed with the representative image of the device is confined to the area enclosed by the edges or the frame.

2. The system according to claim 1, wherein the virtual graphics component of the complete image contains buttons, and wherein the buttons, which are adapted to be animated, are an interactive virtual user interface for access to states or a change in states of the device.

3. The system according to claim 1, wherein the marking pattern arranged on the device further includes at least two mutually perpendicular lines provided inside of the edges or the frame to which the virtual graphics component is configured to be aligned to the representative image displayed on the device to form the complete image.

4. The system according to claim 1, wherein the marking pattern arranged on the device further includes dot or line-shaped encodings, based on which the device is identifiable.

5. The system according to claim 1, wherein the virtual graphics component of the complete image includes graphical user interface buttons, which can be displayed redundant to switching functions on the device or replace switching functions provided on the device.

6. The system according to claim 4, wherein, in the graphics memory, a plurality of virtual graphics components is stored, wherein corresponding to the detected encoding, pre-stored virtual graphics components matching the device are loadable and measured values and/or setting values or buttons of the device are transferred to the graphic components and are updated.

7. The system according to claim 4, wherein in a memory and/or a database, device-specific operating instructions, setup menus, analysis tools, error analysis or data log functions are stored, which are called up in dependence on the detected encoding, are transmitted server-based or locally between the mobile terminal and the memory and/or the database and/or are executable via the mobile terminal and/or the device.

8. The system according to claim 1, wherein, between the device and the mobile terminal, a radio connection, an optical connection and/or a cable are or is provided for a bidirectional data exchange, and wherein the device and the mobile terminal are interconnected via a network, a data bus system and/or an internet connection with the optional aid of a data server.

9. The system according to claim 1, wherein user-specific access rights are provided, which include various access levels, different access extents and/or different access depths for different users to features of the device.

10. The system according to claim 1, wherein the virtual graphics component is a virtual graphic containing animated switches and graphic elements for integration into the complete image shown by the display of the mobile terminal for the user, which are optically modeled after at least one real switch of the device.

11. The system according to claim 1, wherein the display of the mobile terminal comprises a touch sensitive screen.

12. The system according to claim 11, wherein the touch sensitive screen is configured to provide graphic user interface buttons and/or keypads within the virtual graphics component for manipulating functions of the device.

13. The system according to claim 11, wherein the touch-sensitive screen forms the operating unit.

14. The system according to claim 11, wherein the mobile terminal and the device are designed such that for activation of a data transmission between the mobile terminal and the device, the mobile terminal is placed on the device.

15. The system according to claim 14, wherein, for supporting the mobile terminal, the device comprises a support surface having a contact edge, wherein the support surface comprises at least one detection unit for detecting the contact of the device.

16. The system according to claim 3, wherein an analysis unit is provided, wherein the analysis unit is designed to transform the marking pattern, which further includes an alphanumeric or numerical encoding, into a measured value with a unit or another value and to integrate the measured value into the virtual graphics component of the complete image.

17. The system according to claim 1, wherein the representative image is a moving image.

18. The system according to claim 1, wherein, during remote activation and with relative movement of the mobile terminal to the device, the mobile terminal continues to display the representative image of the device as a single or still image and continuously updates the virtual graphics component.

19. The system according to claim 1, wherein the device comprises a measuring device, a unit of equipment and/or an equipment component.

20. The system according to claim 1, wherein the device is a pressure sensor, temperature sensor, force sensor, density meter, flow meter, or level meter connected to processing equipment, including transfer piping or liquid storage tanks or industrial process vessel.

21. The system according to claim 1, wherein the optical detection unit is a camera.

22. A method for detecting, analyzing and manipulating a device using a mobile terminal comprising an optical detection unit, a display, and an operating unit, the method comprising:
  detecting via the optical detection unit, marking patterns on the device, the marking patterns including edges or a frame that encloses an area on the device;
  generating an image of the device on the display;
  deriving device data from the marking patterns;
  associating the device data with a virtual graphics component;
  loading the virtual graphics component based on the associated device data;
  processing the virtual graphics component and the image of the device into a complete image of the device, such that, in the complete image, the virtual graphics component is confined to the area enclosed by the edges or the frame;
  displaying, via the virtual graphics component, an operating state of the device; and
  updating the complete image at predetermined time intervals.

* * * * *